United States Patent
Ette et al.

(10) Patent No.: US 10,877,566 B2
(45) Date of Patent: Dec. 29, 2020

(54) METHOD FOR THE INTERACTIVE PRESENTATION OF CONTENT ON AN OUTER FACE OF A TRANSPORTATION VEHICLE

(71) Applicant: VOLKSWAGEN AKTIENGESELLSCHAFT, Wolfsburg (DE)

(72) Inventors: Bernd Ette, Wolfsburg (DE); Sebastian Jäckl, Wolfsburg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 16/065,849

(22) PCT Filed: Jan. 3, 2017

(86) PCT No.: PCT/EP2017/050074
§ 371 (c)(1),
(2) Date: Jun. 25, 2018

(87) PCT Pub. No.: WO2017/118628
PCT Pub. Date: Jul. 13, 2017

(65) Prior Publication Data
US 2019/0011993 A1 Jan. 10, 2019

(30) Foreign Application Priority Data
Jan. 4, 2016 (DE) .................. 10 2016 100 064

(51) Int. Cl.
*G06F 3/01* (2006.01)
*G07C 9/00* (2020.01)
(Continued)

(52) U.S. Cl.
CPC .......... *G06F 3/017* (2013.01); *B60R 25/2045* (2013.01); *G07C 9/00174* (2013.01);
(Continued)

(58) Field of Classification Search
CPC ... G06F 3/01; G06F 3/20; G06F 3/016; G06F 3/0481; G06F 3/011; G06F 3/017; G06F 3/0484; G06F 3/041
See application file for complete search history.

(56) References Cited

U.S. PATENT DOCUMENTS 7,478,492 B2 * 1/2009 Madonia ................ B60K 35/00
40/591
8,317,329 B2 11/2012 Seder et al.
(Continued)

FOREIGN PATENT DOCUMENTS

CN 101341044 A 1/2009
CN 101866051 A 10/2010
(Continued)

OTHER PUBLICATIONS

Search Report for German Patent Application No. 10 2016 100 0641; dated Nov. 15, 2016.
(Continued)

*Primary Examiner* — Olga V Merkoulova
(74) *Attorney, Agent, or Firm* — Barnes & Thornburg LLP

(57) ABSTRACT

A method for the interactive presentation of content on an exterior surface of a transportation vehicle, wherein the transportation vehicle has a capture device and a display device. The capture device detects when a person approaches the transportation vehicle; switches the display device from an inactive state to an active state when an
(Continued)

approach is detected; recognizes gestures of the person; and alters the presented content of the display device based on the gestures of the person.

13 Claims, 4 Drawing Sheets

(51) Int. Cl.
| | | |
|---|---|---|
| *B60R 25/20* | (2013.01) | |
| *G09G 3/20* | (2006.01) | |
| *B62D 25/04* | (2006.01) | |
| *G09G 3/3208* | (2016.01) | |
| *G09G 3/36* | (2006.01) | |

(52) U.S. Cl.
CPC ........... *G09G 3/2092* (2013.01); *B62D 25/04* (2013.01); *G07C 2009/00769* (2013.01); *G07C 2209/62* (2013.01); *G07C 2209/63* (2013.01); *G09G 3/3208* (2013.01); *G09G 3/36* (2013.01); *G09G 2354/00* (2013.01); *G09G 2380/10* (2013.01)

(56) References Cited

U.S. PATENT DOCUMENTS

| | | | |
|---|---|---|---|
| 8,890,671 B2 | 11/2014 | Wagner | |
| 2010/0075656 A1* | 3/2010 | Howarter | B60R 25/2009 455/420 |
| 2012/0249291 A1 | 10/2012 | Holcomb et al. | |
| 2015/0002642 A1 | 1/2015 | Dressler | |
| 2015/0077237 A1* | 3/2015 | Chou | B60Q 1/50 340/439 |
| 2015/0077327 A1* | 3/2015 | Pisz | B60H 1/00642 345/156 |
| 2015/0077561 A1* | 3/2015 | Schulz | B60N 2/002 348/148 |
| 2015/0081133 A1* | 3/2015 | Schulz | B60K 35/00 701/1 |
| 2015/0262442 A1 | 9/2015 | Chen et al. | |
| 2016/0078795 A1* | 3/2016 | Yeon | G09G 3/20 345/212 |
| 2017/0313248 A1* | 11/2017 | Kothari | B60K 35/00 |
| 2019/0020498 A1* | 1/2019 | Ye | H04L 12/2812 |

FOREIGN PATENT DOCUMENTS

| | | |
|---|---|---|
| CN | 102745127 A | 10/2012 |
| CN | 104915745 A | 9/2015 |
| DE | 102010024573 A1 | 12/2011 |
| DE | 102013106648 A1 | 1/2014 |
| DE | 102014101199 A1 | 8/2015 |
| WO | 2014095512 A1 | 6/2014 |

OTHER PUBLICATIONS

Office Action for German Patent Application No. 10 2016 100 0641; dated Feb. 14, 2017.

Search Report for International Patent Application No. PCT/EP2017/050074; dated Apr. 21, 2017.

\* cited by examiner

METHOD FOR THE INTERACTIVE PRESENTATION OF CONTENT ON AN OUTER FACE OF A TRANSPORTATION VEHICLE

PRIORITY CLAIM

This patent application is a U.S. National Phase of International Patent Application No. PCT/EP2017/050074, filed 3 Jan. 2017, which claims priority to German Patent Application No. 10 2016 100 064.7, filed 4 Jan. 2016, the disclosures of which are incorporated herein by reference in their entireties.

SUMMARY

Illustrative embodiments relate to a communication unit configured to be arranged at an exterior surface of a transportation vehicle, a b-pillar, a transportation vehicle and a method for an interactive illustration of contents at an exterior surface of a transportation vehicle.

BRIEF DESCRIPTION OF THE DRAWINGS

Disclosed embodiments are explained using the associated drawings, in which.

DETAILED DESCRIPTION

Figure 1:
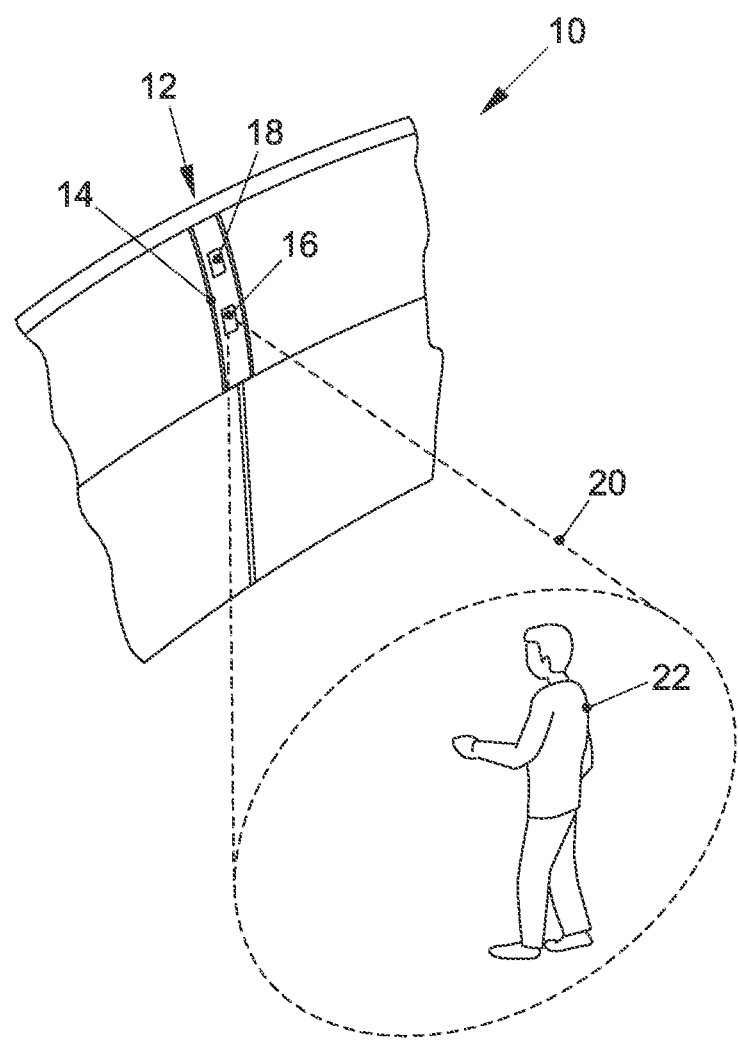
FIG. 1 shows a schematic illustration of a communication unit in a b-pillar of a transportation vehicle.

More and more, for transportation vehicles sensor for gesture recognition are used which, for example, allow opening a tailgate by foot.

DE 10 2014 101 199 A1 discloses an optical sensor system for a transportation vehicle with an optical sensor and an apparatus for fading in a light area for detecting gestures. A display device is not present.

For access control DE 10 2013 106 648 A1 discloses a virtual keyboard of a light-reactive substance in a transportation vehicle window and a camera for detecting finger movements in front of the keyboard. The virtual keyboard is only made visible in case of an activity by an illumination by light.

Disclosed embodiments improve communication at a transportation vehicle by use of gestures.

Disclosed embodiments provide a communication unit, a b-pillar, a transportation vehicle, and/or a method.

The disclosed communication unit configured for an arrangement at an exterior surface of a transportation vehicle includes a detection device and a display device, wherein the detection device is configured to detect a person approximating the transportation vehicle and to switch a content of the display device from an inactive state into an active state if an approximation is detected. It is provided for the detection device to be configured to detect gestures of the person and to change represented contents of the display device depending on the gestures.

Disclosed embodiments provide for the combination of a detection device acting as a gesture sensor with a display device reacting to the detected gesture an intuitive and interactive operation is enabled. This way, the person may change and/or select the represented contents. The contents may have an informative character, like, for example, comprise information on the transportation vehicle, the weather, the calendar of the person, state of a car door or the garage door (open/closed), etc. Alternatively, the information may have control character, i.e. by actuation and/or operating on information, like, for example, a symbol or an icon, an actuator, for example, of a door or an electric window lift is activated by a corresponding gesture.

The detection device may comprise an infrared sensor, a camera, an ultrasound sensor or a radar sensor. Each of these technologies is suitable to reliably detect both an approximation and also gestures.

The display device may comprise a display based on a TFT, LCD or OLED technology. Each of these technologies is well suited to represent both contents like, for example, icons, symbols, images or characters and also at least one color surrounding the communication unit.

It may be provided that the display device is configured to represent the color of the exterior surface of the transportation vehicle in an inactive state. This way, the display device may not be detected in an inactive state which enables new possibilities with respect to design and safety.

It may further be provided that a continuous, transparent cover is provided at an exterior side covering the detection device and the display device and that at an interior side of the cover a colored layer permeable for the detection device is arranged and that the layer comprises a recess for the display device in the area of the display device. This set-up realizes a uniform surface and hides the interactive functionality.

The display device may represent contents adaptively depending on the location of the transportation vehicle, the time, the weather and/or the person. This way, operability is substantially simplified as only relevant contents, i.e. contents important or needed in the respective environment are displayed with a higher probability. The person may, for example, also pre-configure the represented contents. It is possible that first of all a main menu is represented which may be configured by the system and/or the person. This configuration may also be executed adaptively, i.e. considering, for example, the above mentioned environmental variables.

The disclosed B-pillar is configured for being mounted in a transportation vehicle and provides for a communication unit as mentioned above to be provided. The arrangement of the communication unit in the B-pillar enables good operability as it is arranged between the doors which in most cases is the first contact point between person and transportation vehicle. Otherwise, the same properties and modifications as described hereinabove apply.

The disclosed transportation vehicle includes a communication unit as described above and/or a B-pillar as described above. For example, a communication unit may be arranged in the area of the tailgate. It is generally possible to provide a communication unit at every potential point of contact of the transportation vehicle and the person. This may be at any side of the transportation vehicle or in defined access or action areas like doors, gates or the like. The same properties and modifications as described above apply.

The disclosed method for an interactive illustration of contents at an exterior surface of a transportation vehicle, the transportation vehicle comprising a detection device and a display device, comprises the following acts:

detecting an approximation of a person to the transportation vehicle;
switching the display device from an inactive state into an active state in case of a detected approximation;
detecting gestures of the person; and
changing the represented contents of the display device depending on the gestures.

The same properties and modifications as described above apply.

It may be provided that the display device is only switched when a targeted approximation of the person to the transportation vehicle is detected. This way, energy may be saved and the possibility of operating errors or attacks is reduced. By this measure, the willingness of a person to interact with the transportation vehicle is detected.

It may further be provided that the display device is only switched when a standstill of the person in front of the detection device is detected. This way, further energy may be saved and the possibility of operating errors or attacks is reduced. By this measure, the willingness of a person to interact with the transportation vehicle is detected.

It may further be provided that the display device is only switched when the person is identified as an authorized person for the transportation vehicle. This authorization may, for example, be requested via an electronic key of a mobile device for access authorization like, for example, a smart phone with a corresponding app. It may thus be guaranteed that the displayed contents are only presented to the respectively authorized person.

It may be provided that the display device is switched from the active state into the inactive state if it is detected that the person leaves a detection area of the detection device. Thus, the interaction between person and transportation vehicle is terminated and no contents determined for the person are represented any more. The detection area may, for example, comprise a distance of approximately two meters.

By the display device contents may be illustrated adaptively depending on the location of the transportation vehicle, the time, the weather and/or the person. These contents may be selected by a controller which considers inputs of the person for future interaction in a self-learning way. Alternatively or additionally, the person may also configure contents. This may take place directly at the communication unit, in the transportation vehicle or with a remote computational unit like, e.g., a computer, television, tablet, smart phone or the like, wherein the configuration data is then transmitted to the communication unit.

The different embodiments mentioned in this application may, as far as not indicated otherwise, be combined.

FIG. 1 shows a lateral partial illustration of a transportation vehicle 10, here as an automobile. Further, trucks, busses, motorcycles, rail transportation vehicles as well as aircraft and watercraft are considered to be transportation vehicles.

The transportation vehicle 10 includes a b-pillar 12 arranged between two doors. In the b-pillar 12 a communication unit 14 is integrated. The communication unit 14 includes a detection device 16, for example, as an infrared sensor, and a display device 18, for example, as a display. The detection device 16 has a detection area 20 which is, for example, cone-shaped. The height of the cone, i.e. the length of the detection area 20, may, for example, be approximately two meters. The opening angle of the cone and/or the detection area 20 may, for example, be between sixty and one hundred and seventy degrees. Thus, a person 22 approximating the B-pillar 12 and/or the communication unit 14 may be detected well. Apart from a mere detection of an approximating person 22, the detection device 16 and/or the communication unit 14 detects gestures of the person.

Further, the transportation vehicle 10 optionally comprises an access control with authentication not illustrated here for clarity, for example, with a radio-based key.

The communication unit 14 may be arranged at a different exterior surface of the transportation vehicle 10, for example, at another pillar in the area of a tailgate or in the front area of the transportation vehicle 10. It may further be the case that communication units 14 are provided in several or all of these places.

Figure 2:
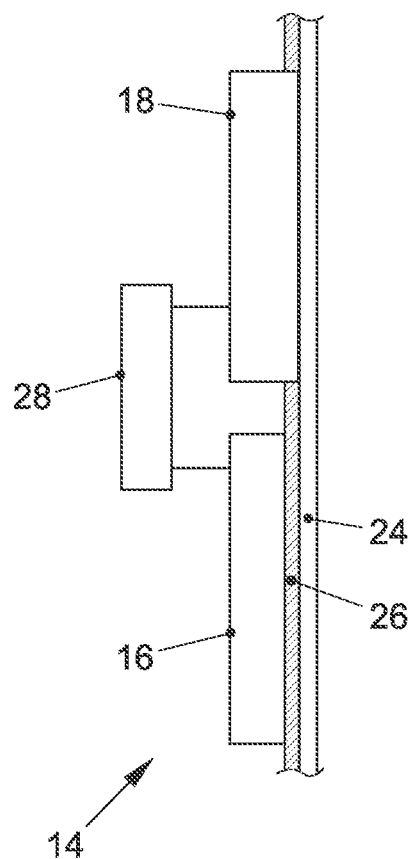
FIG. 2 shows a schematic sectional view of the communication unit.

With reference to FIG. 2 now the set-up of the communication unit 14 is described. At an exterior side of the communication unit 14 facing away from a passenger space of the transportation vehicle 10 first of all a continuous, optically transparent cover 24 is provided. The cover 24, for example, consists of a thin plastics layer and covers the detection device 16 and the display device 18. The display device 18 is arranged directly at the cover 24 so that the illustration of the display device 18 is visible through the cover 24.

At an interior side of the cover 24 a colored layer 26 is arranged which is permeable for the detection device 16. The layer 26 has a recess for the display device 18 as the layer 26 is not optically permeable. For example, the detection device 16 comprises an infrared sensor and the layer 26 is permeable or transparent for light or radiation in the infrared range.

From the outside, the communication unit 14 comprises an integral smooth surface, i.e. the optically transparent cover 24. The layer 26 behind the same dictates the color design which may be adapted to further parts of the transportation vehicle 10. In an inactive state of the communication unit 14, i.e. when no contents are presented to the person 22, the display device 18 is switched or controlled such that it represents the color of the layer 26, so that from the outside the impression of a monochromatic surface results. The cover 24 and layer 26 consist of plastics, for example, of PMMA (polymethylmethacrylate) or the like.

The communication unit 14 further includes a controller 28 in connection with the detection device 16 and the display device 18. The controller 28 may be integrated in a housing together with the detection device 16 and the display device 18 so that a compact and complete communication unit 14 is formed. The controller 28 communicates with further controllers of the transportation vehicle 10 which are not illustrated here, like, for example, a controller for a keyless access control. The controller 28 processes signals or information from the detection device 16 and transmits corresponding signals or commands which are, for example, based on the detected gestures to the display device 18. It is possible that the controller 28 is integrated into the detection device 16 or the display device 18.

Figure 3:
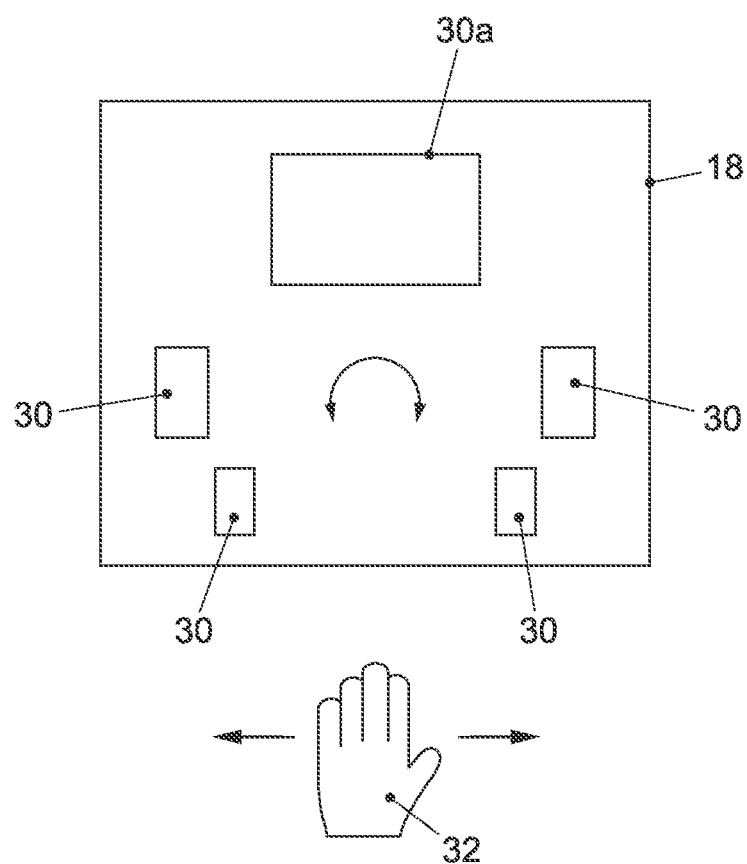
FIG. 3 shows a schematic illustration of the operation of a display device.

In FIG. 3, an example of a screen representation of the display device 18 is illustrated. FIG. 3 shows an active state, i.e. after a detected approximation of a person 22. In this state, contents 30 are illustrated exemplarily. These contents 30, for example, comprise icons or symbols for the functions open/close door, open/close window, extend/retract sunblind with a transportation vehicle equipped with a sunblind, open/close letterbox at the house, open/close garage door. Provided are also icons or symbols for information regarding the status of the transportation vehicle, the charging state of a battery, the presence or absence of items in the transportation vehicle like, for example, sunglasses, umbrella, briefcase, child seat, etc.

For the interactive operation of the display device 18 and possibly further actuators as described hereinabove gestures of a hand 32 of the person 22 are detected by the detection device 16 and allocated to a command in the controller 28. This accordingly changes the representation in the display device 18 via a control command.

In FIG. 3 a kind of menu structure with several contents or symbols 30 is illustrated. Via wipe gestures to the left or right, as indicated by the arrows, the contents or symbols 30 may be rotated as indicated by the bent arrow. The symbol and/or the content 30*a* is currently preselected and thus illustrated larger and at the top. To select this content 30*a* a further gesture is necessary. This happens, for example, by moving the open hand towards the communication unit 14. After the selection the desired action is started and/or the desired information displayed. It may be provided that after a given time period, for example, in a range of several seconds, an automatic transfer back into the menu structure is executed.

The menu structure is configurable. This may on the one hand be done by the person, either directly at the transportation vehicle 10 and/or the communication unit 14 or on a further device like a computer or smartphone which then transfers the configuration to the transportation vehicle 10 and/or the communication unit 14.

On the other hand the contents and the menu structure may be adapted. This adaptation is done by the communication unit 14. For example, contents are adaptively illustrated depending on the location of the transportation vehicle, the time, the weather and/or the person. Thus, for example, at a location with a garage, for example, at home or at the office, the content open/close garage door may be illustrated. This content is not illustrated at a parking place, for example, when going shopping. This way, the person 22 is relieved by not illustrating unnecessary contents. The communication unit receives the data required for the adaptive illustration from further controllers of the transportation vehicle 10, like, for example, a GPS module, cameras monitoring the surroundings, temperature sensor, the calendar of the person 22 or further sources.

Figure 4:
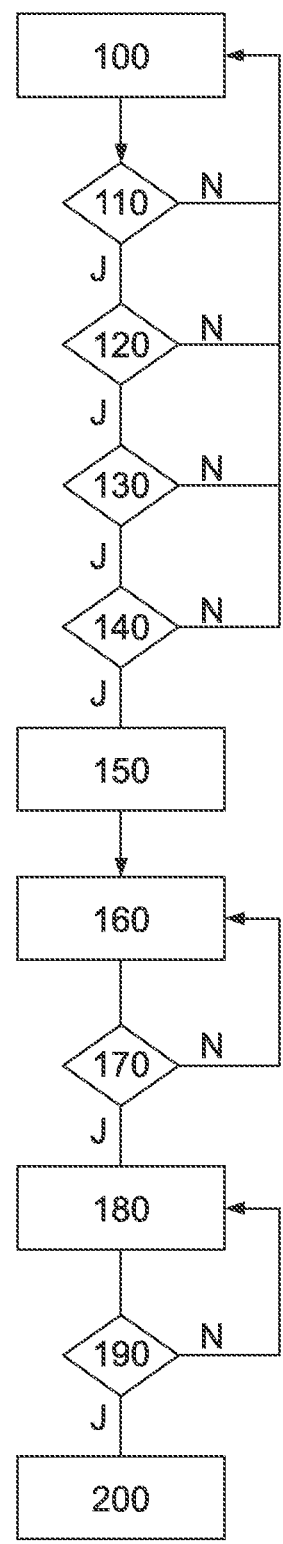
FIG. 4 shows a flow chart of a method for an interactive illustration of contents at an exterior surface of a transportation vehicle.

FIG. 4 shows a flow chart of a method for an interactive illustration of contents at an exterior surface of the transportation vehicle 10. At the exterior surface, here the B-pillar 12, the communication unit 14 including the detection device 16 and the display device 18 is arranged.

In a first act 100 monitoring is activated, i.e. the detection device 16 is switched on. In act 110 an approximation of a person 22 to the transportation vehicle 10 is detected when the same moves into the detection area 20.

In act 120 it is checked whether a targeted approximation of the person 22 to the transportation vehicle 10 is detected. If this is the case, the method continues. If this is not the case, for example, when a passer-by passes the transportation vehicle 10, a branch back to act 100 is taken.

In act 130 it is checked whether a standstill of the person 22 in front of the detection device 16 is detected. If this is the case, the method continues. If this is not the case, for example, when a passer-by only stops briefly, a branch back to act 100 is taken. For checking the standstill, a standstill time, for example, in the range of several seconds, like one to five seconds, may be defined. Only when reaching this standstill time does the method continue.

In act 140 it is checked whether the person 22 is an authorized person for the transportation vehicle 10. This is done, for example, via the keyless access control. If this is the case, the method continues. If this is not the case, for example, when no suitable key is given, a branch back to act 100 is taken.

In act 150 contents to be represented are prepared adaptively depending on the location of the transportation vehicle, the time, the weather, the person and/or further conditions. Up to now, the display device 18 has not been activated, acts 110 to 150 serve for preparation. It is to be prevented that the display device 18 may at all be activated by a non-authorized person and that the contents intended for the person 22 are shown to third parties. Further, unnecessary energy consumption is to be prevented. Thus, keyless access control is activated only relatively late in act 140 if an intended use of the communication unit 14 is detected. Acts 120 to 150 are optional and may also be executed in any other order.

If the above mentioned requirements are fulfilled, in an act 160 the display device 18 is switched from an inactive state into an active state in case an approximation of the person 22 is detected. That means it is switched from a representation of the color of the colored layer 26 into a representation of the contents 30 and 30*a*. Firstly, for example, a personalized welcome may be represented.

In a further act 170 gestures of the hand 32 of the person 22 are detected. If no gesture is detected, a branch back to act 160 is taken, whereby a detection loop results. If a gesture is detected, the method continues.

In an act 180 now the represented contents of the display device 18 are changed depending on the detected gesture or gestures so that an interactive communication takes place. It is possible to detect and process several gestures in a temporally spaced manner so that a smooth interaction of the person 22 through different menus, menu levels and/or functions is facilitated.

In an act 190 the display device is switched from the active state into the inactive state if it is detected that the person 22 leaves the detection area 20 of the detection device 16. It may also be provided that for this function a dedicated gesture for logout is provided.

In summary, an interactive communication which is easy to operate and secure for a person 22 with a transportation vehicle 10 is provided.

REFERENCE NUMERALS LIST

10 transportation vehicle
12 b-pillar
13 communication unit
16 detection device
18 display device
20 detection area
22 person
24 cover
26 layer
28 controller
30 content
32 hand

The invention claimed is:

1. A communication unit for an arrangement on an exterior surface of a transportation vehicle, the communication unit comprising:
    a detection device; and
    a display device,
    wherein the detection device detects a person near the
        transportation vehicle and, in response to detection of a detected content switches the display device from an inactive state to an active state, wherein the detection device recognizes gestures of the person and displays the detected content of the display device in response to the gestures of the person, wherein the display device is switched from the active state into the inactive state in response to the person leaving a detection area of the detection device, and wherein the display device displays the color of the exterior surface of the transportation vehicle in an inactive state.

2. The communication unit of claim 1, wherein the detection device comprises an infrared sensor, a camera, an ultrasonic sensor or a radar sensor.

3. The communication unit of claim 1, wherein the display device comprises a display based on a TFT, LCD or OLED technology.

4. The communication unit of claim 1, wherein the communication unit comprises continuous, transparent cover covering the detection device and the display device on an exterior side and a colored layer permeable to the detection device is arranged on an interior side, and the layer has a recess for the display device in the region of the display device.

5. The communication unit of claim 1, wherein the display device adaptively illustrates the detected content depending on the location of the transportation vehicle, the time, the weather and/or the person.

6. A B-pillar for mounting in a transportation vehicle, wherein a communication unit is integrated into the B-pillar for an arrangement on an exterior surface of the transportation vehicle, the communication unit comprising a detection device and a display device, wherein the detection device detects a person near the transportation vehicle and, in response to detection of a detected content switches the display device from an inactive state to an active state, and wherein the detection device recognizes gestures of the person and displays the detected content of the display device in response to the gestures of the person and wherein the display device is switched from the active state into the inactive state in response to the person leaving a detection area of the detection device.

7. A transportation vehicle comprising a communication unit integrated into a B-pillar for an arrangement on an exterior surface of the transportation vehicle, the communication unit comprising a detection device and a display device, wherein the detection device detects a person near the transportation vehicle and, in response to detection of a detected content switches the display device from an inactive state to an active state, wherein the detection device recognizes gestures of the person and displays the detected content of the display device in response to the gestures of the person, and wherein the display device is switched from the active state into the inactive state in response to the person leaving a detection area of the detection device.

8. A method for interactively displaying content on an exterior surface of a transportation vehicle, the transportation vehicle having a detection device and a display device, the method comprising:

detecting an approach of a person to the transportation vehicle;

switching the display device from an inactive state to an active state at a detected approach;

recognizing gestures of the person; and changing the displayed contents of the display device in response to the gestures, wherein the display device is switched from the active state into the inactive state in response to the person leaving a detection area of the detection device, and wherein the display device displays the color of the exterior surface of the transportation vehicle in an inactive state.

9. The method of claim 8, wherein the display device is switched only when a targeted approach of the person to the transportation vehicle is detected.

10. The method of claim 9, wherein the display device is switched only when a standstill of the person in front of the detection device is detected.

11. The method of claim 8, wherein the display device is switched only when the person is identified as an authorized person for the transportation vehicle.

12. The method of claim 8, wherein contents are adaptively represented by the display device based on the location of the transportation vehicle, the time, the weather and/or the person.

13. A communication unit for an arrangement on an exterior surface of a transportation vehicle, the communication unit comprising:

a detection device;

a display device, wherein the detection device detects a person near the transportation vehicle and, in response to detection of a detected content switches the display device from an inactive state to an active state, wherein the detection device recognizes gestures of the person and displays the detected content of the display device in response to the gestures of the person, and wherein the display device is switched from the active state into the inactive state in response to the person leaving a detection area of the detection device; and a continuous, transparent cover covering the detection device and the display device on an exterior side and a colored layer permeable to the detection device is arranged on an interior side, and the layer has a recess for the display device in the region of the display device.

* * * * *